United States Patent [19]

Araujo et al.

[11] Patent Number: 5,430,573
[45] Date of Patent: Jul. 4, 1995

[54] UV-ABSORBING, POLARIZING GLASS ARTICLE

[75] Inventors: Roger J. Araujo, Horsheads; Nicholas F. Borrelli, Elmira; Josef C. Lapp; David W. Morgan, both of Corning, all of N.Y.

[73] Assignee: Corning Incorporated, Corning, N.Y.

[21] Appl. No.: 166,833

[22] Filed: Dec. 15, 1993

[51] Int. Cl.⁶ .................. G02B 1/08; C03B 37/00; C03C 3/11; C03C 4/08
[52] U.S. Cl. .................. 359/361; 65/32.1; 65/32.3; 359/490; 501/53; 501/56; 501/905
[58] Field of Search .............. 359/490, 491, 492, 350, 359/361; 65/32.3, 32.1; 501/905, 53, 56

[56] References Cited

U.S. PATENT DOCUMENTS

| | | | |
|---|---|---|---|
| 3,325,299 | 6/1967 | Araujo | 106/52 |
| 3,540,793 | 11/1970 | Araujo et al. | 350/147 |
| 3,653,863 | 4/1972 | Araujo et al. | 65/30 |
| 3,954,485 | 5/1976 | Seward, III et al. | 106/47 Q |
| 4,304,584 | 12/1981 | Borelli et al. | 65/30.11 |
| 4,339,256 | 7/1982 | Simms | 65/32 |
| 4,479,819 | 10/1984 | Borelli et al. | 65/30.11 |
| 4,792,535 | 12/1988 | Fine | 501/56 |
| 5,045,509 | 9/1991 | Kiefer | 501/905 |
| 5,275,979 | 1/1994 | Borrelli et al. | 501/56 |
| 5,281,562 | 1/1994 | Araujo et al. | 501/905 |
| 5,300,465 | 4/1994 | Grateau et al. | 501/905 |
| 5,322,819 | 6/1994 | Araujo et al. | 501/905 |

FOREIGN PATENT DOCUMENTS

4-279337 9/1992 Japan .

*Primary Examiner*—Martin Lerner
*Attorney, Agent, or Firm*—Milton M. Peterson; Clinton S. Janes, Jr.

[57] ABSTRACT

A UV-absorbing, polarizing glass article and method of making, the glass having an $R_2O$-$B_2O_3$-$SiO_2$ base glass composition, a sharp spectral cut-off at about 400 nm, a precipitated crystal phase consisting of a halide selected from the group composed of cuprous, cadmium and mixed cuprous-cadmium halides, the crystallites in the crystal phase being elongated, and a portion of the crystallites near the surface of the article being at least partially reduced to colloidal copper, whereby the article exhibits permanent dichroic behavior.

12 Claims, 1 Drawing Sheet

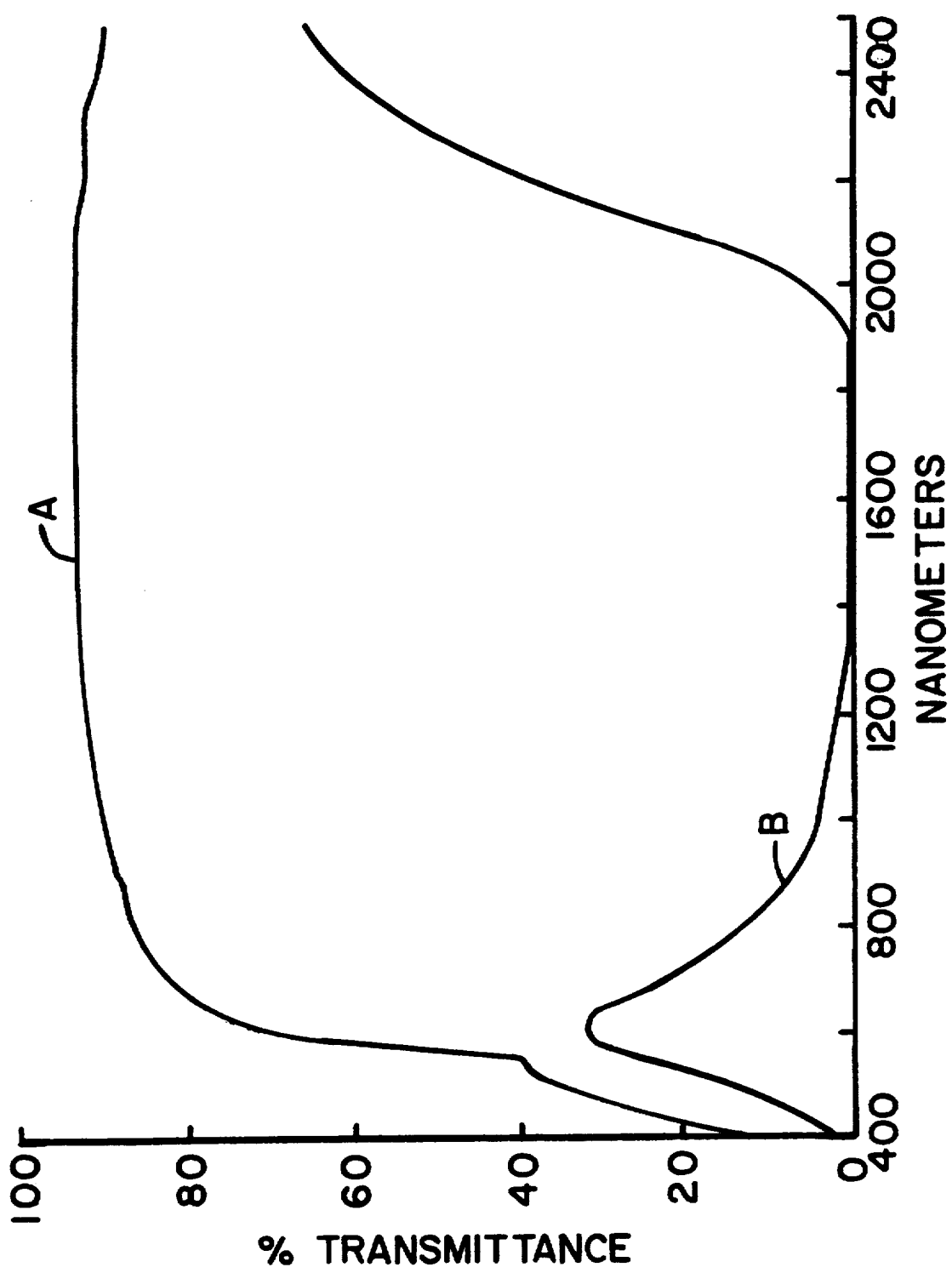

ns. Copper and/or cadmium oxides, together with sufficient chlorine, bromine and/or iodine to react stoichiometrically with at least 0.3% copper and/or cadmium, are added to the base glass composition.

UV-ABSORBING, POLARIZING GLASS ARTICLE

FIELD OF THE INVENTION

A UV-absorbing, polarizing glass article having a copper, or copper-cadmium, halide crystal phase.

BACKGROUND OF THE INVENTION

U.S. Pat. No. 3,325,299 (Araujo) discloses phototropic (now known as photochromic) glasses in which copper and/or cadmium halide crystals are precipitated to impart photochromic behavior. The disclosed glasses have $R_2O$-$Al_2O_3$-$B_2O_3$-$SiO_2$ base compositions. Suitable base glass compositions are disclosed as consisting essentially of, in weight percent on an oxide basis, 40–75% $SiO_2$, 4–26% $Al_2O_3$, 4–26% $B_2O_3$ and at least one alkali metal oxide ($R_2O$) selected from 2–8% $Li_2O$, 4–15% $Na_2O$, 6–20% $K_2O$, 8–25% $Rb_2O$ and 10–30% $Cs_2O$. These oxides total at least 85% of the glass composition. Copper and/or cadmium oxides, together with sufficient chlorine, bromine and/or iodine to react stoichiometrically with at least 0.3% copper and/or cadmium, are added to the base glass composition.

The disclosed copper and/or cadmium halide glasses are described as having certain advantages with respect to the better known silver photochromic glasses. In particular, they are described as having an optical density more closely related to incident actinic radiation, and also as being less temperature dependent.

U.S. Pat. No. 5,281,562 (Araujo et al.) is directed to a family of glasses which also contain a cuprous and/or cadmium halide crystal phase, and which are strongly absorbing in the ultraviolet region of the radiation spectrum. They have a sharp spectral cut-off of shorter wavelengths at about 400 nm. However, they are non-photochromic, and may be essentially colorless. As expressed in cation %, the compositions of these glasses consist essentially of 35–73% $SiO_2$, 15–45% $B_2O_3$, 0–12% $Al_2O_3$, the content of $Al_2O_3$ being less than 10% when the $SiO_2$ content is greater than 55%, 4.75–20% $Li_2O+Na_2O+K_2O$ consisting of 0–12% $Li_2O$, 0–20% $Na_2O$ and 0–12% $K_2O$, 0–5% $CaO+SrO+BaO$ consisting of 0–5% CaO, 0–5% SrO, and 0–5% BaO, 0.125–1% $Cu_2O$, 0–1% CdO, 0–5% $ZrO_2$, 0–0.75% $SnO_2$, 0–1% $As_2O_3$ and/or $Sb_2O_3$, the glass also containing in weight %, 0.25–2% Cl+Br consisting of 0–1.75% Cl and 0–1% Br, and 0–2% F, and having an R-value, calculated in cation %, of 0.15–0.45, the R-value not exceeding 0.30, except as the glass composition meets at least one of the following conditions: up to 12 cation % $Li_2O$, less than 10 cation % $Al_2O_3$, at least 0.3 cation % $Cu_2O$, 0.5–2 weight percent Cl+Br.

The application explains that cadmium is not required to secure absorption of ultraviolet radiation, and imparts no exceptional benefit to the glass. The halide crystals are effective to absorb ultraviolet radiation, but cadmium is known to be extremely toxic. Accordingly, its presence is severely restricted, and it is preferably completely avoided. Therefore, while cadmium halide glasses are within the scope of the present invention, reference throughout will be to copper halide glasses.

U.S. Pat. No. 3,540,793 (Araujo et al.) discloses that photochromic glasses, based on silver halide crystals, can also be rendered polarizing in the darkened state. This dual effect is accomplished by thermally softening and stretching the softened glass. This elongates the silver halide crystals and generates a birefringent effect in the glass. When the glass is darkened, the anisotropy of the silver halide particles is also manifested in an observed dichroism.

Subsequently, U.S. Pat. No. 4,304,584 (Borrelli et al.) reports that a permanent polarizing effect can be obtained. This is accomplished by heat treating the stretched glass, containing the elongated silver halide crystals, in a reducing atmosphere. This thermal reduction treatment is carried out at a temperature below the glass annealing point, but above 300° C. It chemically reduces the elongated silver halide crystals to elongated particles of metallic silver. Still later, it was learned that the polarizing effect, obtained by thermal reduction, could be extended to the infra-red portion of the spectrum. This is reported in U.S. Pat. No. 4,479,819 (Borrelli et al.).

It has been found that the copper and cadmium halide photochromic glasses disclosed in U.S. Pat. No. 3,325,299 can also be rendered polarizing, when in the darkened state, by thermally softening the glass and stretching, or otherwise elongating, it. This action elongates the halide crystals and is described in detail in U.S. Pat. No. 3,954,485 (Seward III, et al.).

The present invention provides glasses containing copper halide crystals and having unique polarizing characteristics. It further provides such glasses having the property of a sharp spectral cut-off at about 400 nm. It also provides a method of imparting the unique polarizing characteristics to known glasses containing copper halide crystals.

SUMMARY OF THE INVENTION

The product aspect of the invention is a UV-absorbing, polarizing glass article, the glass having an $R_2O$-$B_2O_3$-$SiO_2$ base glass composition, a sharp spectral cut-off at about 400 nm, a precipitated crystal phase consisting of a halide selected from the group composed of cuprous, cadmium, and mixed cuprous-cadmium halides, the crystallites in the crystal phase being elongated and a portion of the crystallites near the surface of the article being at least partially reduced to colloidal copper, whereby the article exhibits a permanent dichroic behavior.

The invention further resides in a method of producing a UV-absorbing, polarizing glass article which comprises the steps of melting a $R_2O$-$B_2O_3$-$SiO_2$ glass containing at least 0.2% $Cu_2O$ by weight together with a sufficient amount of at least one halogen selected from the group consisting of Cl, Br and I to react with at least 0.2% copper, precipitating a cuprous halide crystal phase in the glass, subjecting the glass to stress in one direction at a temperature at or above the glass softening point to elongate the glass and the cuprous halide crystallites therein, and then exposing the glass to a reducing atmosphere to reduce at least a portion of the copper halide crystals to metallic copper in a thin layer near the surface of the glass.

DESCRIPTION OF THE INVENTION

The present invention encompasses any $R_2O$-$B_2O_3$-$SiO_2$ base glass in which cuprous halide crystals can be precipitated. Thus, the invention is applicable to both the photochromic glasses disclosed in U.S. Pat. No. 3,325,299, and the non-photochromic glasses disclosed in pending application Ser. No. 07/981,409.

The invention arose from an investigation of these glasses having precipitated, cuprous chloride crystal phases. It is based on discovery that unique polarizing effects can be achieved in such glasses by a thermal reduction treatment after elongation of the crystallites.

It had previously been observed that photochromic glasses, based on copper and cadmium halides, could be rendered polarizing in the darkened state by placing a bar of glass under uni-directional stress at an elevated temperature to elongate the glass bar and consequently the halide crystallites contained therein. The present investigation was undertaken to determine whether the copper halide glasses could be rendered permanently polarized. More particularly, the investigation was directed at determining whether a permanent polarizing effect could be achieved by exposing a stretched glass to a thermal reduction treatment.

It was found that a thermal reduction treatment would indeed reduce cuprous halide crystallites in a thin surface layer, at least in part, to copper metal. The term "thermal reduction" refers to a chemical reduction of a copper ion to the metallic state in a cuprous halide crystallite in glass while the glass is heated at an elevated temperature.

In silver halide glasses, it is desirable to conduct the thermal reduction at a temperature above 400° C. to maximize the polarizing behavior. This condition is also desirable with the present copper halide glasses. While any reducing atmosphere may be employed, we prefer to employ hydrogen in order to achieve the desired degree and depth of reduction in a reasonable time.

Quite unexpectedly, it was found that the observed absorption spectrum could vary with the direction of polarization of the light in an especially desirable way. Light polarized parallel to the stretched direction (the long axis of the copper particle) provides a green color with a distinct transmittance maximum at about 550 nm. This results from a decrease in transmittance below 500 nm with a consequent sharpening of the green color. Light polarized in a perpendicular direction was found to be essentially red in color.

This color phenomenon is particularly desirable because it presents the possibility of creating a two color display without using a color filter. Thus, color would be controlled by orientation of the polarization. A particular area of interest is in LCD displays where production of a color filter is a major concern.

The character of the absorption curves observed in the present invention differs from that observed in stretched silver halide in one further important aspect. In the silver halide system, the absorption measured parallel to the stretch axis is stronger than that measured perpendicular at long wavelengths, but it is weaker at shorter wavelengths. In the copper halide system, the absorption measured parallel to the stretch axis is stronger than that measured perpendicular for all wavelengths in the visible and near IR. This is due, in part, to the fact that interband absorption, which is negligible with silver, makes an important contribution to the optical constants of copper.

The contrast between the transmittance of light polarized perpendicular to the stretch axis of a copper halide system glass, and of light polarized parallel to the axis, can be seen in TABLE I.

TABLE I shows transmittance values, at three different wavelengths (nm), of light polarized perpendicular to the stretch axis (T1) and of light polarized parallel to the axis (T11). It also shows the ratio of these measured values. The transmittance measurements were made on a glass bar heat treated at a temperature of 725° C., and stretched at the glass softening point by an applied stress of 18,750 Pa (2700 psi). The stretched bar was then reduced for two hours in a hydrogen atmosphere at a temperature of 380° C.

TABLE I

| Wavelength | T (%) 1 | T (%) 11 | Ratio |
|---|---|---|---|
| 610 | 72.6 | 5.6 | 13 |
| 560 | 40.0 | 18.3 | 2 |
| 460 | 25.7 | 9.0 | 3 |

Certain conditions are essential in a suitable glass for present purposes, whether the glass is photochromic or non-photochromic. Initially, in either type of glass, it is essential to produce a cuprous halide crystal phase. To do so, it is necessary to provide, in the glass batch, both a source of copper and a source of halogen selected from chlorine, bromine, and iodine.

The crystal phase may be precipitated in the glass as a formed article is cooled. However, it is generally desirable to cool the glass rapidly, thereby avoiding crystal development. Then, the glass may be reheated to precipitate the cuprous halide crystal phase. To this end, the glass is heated above its strain point, but below about 900° C. Generally a temperature in the range of 660°–750° C. is preferred for this purpose, although temperatures in the range of 500°–900° C. are contemplated.

To provide a sharp cut-off of ultraviolet radiation at about 400 nm, cuprous halide crystals must be developed in the glass. For that purpose, the glass composition requires at least 0.2 weight percent cuprous oxide ($Cu_2O$). Up to about 2% $Cu_2O$ may be employed, but cuprous ions tend to disproportionate into cupric ions and neutral atoms at such higher levels. Therefore, the preferred maximum $Cu_2O$ content is about 1.0% by weight. The cuprous ion imparts no visible color to the glass, whereas the cupric ion generally provides a blue-green color. Because only the cuprous ion is necessary for the formation of cuprous halides, colorless glasses with a sharp cut-off of ultraviolet radiation may be secured by appropriate adjustment of the oxidation state of the copper.

The oxidation state of the copper is influenced by the temperature at which the glass batch is melted, by the partial pressure of oxygen to which the molten batch is exposed, by the concentration of polyvalent ions in the glass, and by the basicity (the R-value) of the glass. The oxides of arsenic, antimony and tin are illustrative of polyvalent metal oxides that are especially useful since they do not directly impart color to the glass.

Chlorine or bromine must be present to combine with the copper to form the necessary cuprous halide crystal phase. Iodine is also effective, but is not normally employed. The inclusion of fluorine may be useful, but it does not produce cuprous halide crystals in the absence of chlorine or bromine.

A particularly significant control factor is the R-value, a measure of the basicity of a glass. This value is expressed in mole % on an oxide basis as calculated from the formula:

$$R = \frac{M_2O + 2MO - Al_2O_3 - ZrO_2}{B_2O_3}$$

$M_2O$ designates alkali metal oxides, and MO represents alkaline earth metal oxides. Cuprous halide crystals can be developed in glasses with R-values below 0.15. Nevertheless, the development is slow, there is no substantial advantage in these glasses, they tend to be difficult to melt and they have poor chemical durability. Glasses with an R-value greater than 0.30 do not provide the desired crystal phase, except under certain compositional conditions. Glasses with a value over 0.45 are not suitable under any condition. Glasses with an R-value of about 0.25 are generally optimal for the development of a cuprous halide crystal phase.

TABLE II, below, sets forth, in terms of oxides and halogens, the approximate ranges, in weight percent, for glass compositions in which cuprous chloride crystals can be precipitated in the glass. The first column identifies the composition components; the second column, the ranges for non-photochromic (Non-PC) glasses; the third column, the ranges for photochromic (PC) glasses; the fourth column, consolidated (Cons.) ranges for all glasses within the scope of the present invention.

TABLE II

| Comp. | Non-PC | PC | Cons. |
| --- | --- | --- | --- |
| $SiO_2$ | 48–80 | 40–75 | 40–80 |
| $B_2O_3$ | 10–35 | 4–26 | 4–35 |
| $Al_2O_3$ | 0–12 | 4–26 | 0–26 |
| $Li_2O$ | 0–4 | 2–8 | 0–8 |
| $Na_2O$ | 0–14 | 4–15 | 0–15 |
| $K_2O$ | 0–12 | 6–20 | 0–20 |
| $Li_2O+Na_2O+K_2O$ | 4–15 | 2–20 | 2–20 |
| $CaO+BaO+SrO$ | 0–10 | — | 0–10 |
| $Cu_2O$ | 0.2–1.6 | 0.3–2 | 0.2–2 |
| CdO | 0–2 | 0.3–2 | 0–2 |
| $ZrO_2$ | 0–12 | — | 0–12 |
| $SnO_2$ | 0–2.5 | — | 0–2.5 |
| $As_2O_3+Sb_2O_3$ | 0–2 | — | 0–2 |
| Cl | 0–1.75 | 0–2 | 0–2 |
| Br | 0–1.0 | 0–2 | 0–2 |
| Cl+Br | 0.25–2.0 | — | 0.25–2.0 |
| F | 0–2 | 0–2 | 0–2 |
| R-value | 0.15–0.45 | — | 0.15–0.45 |

The compositional overlap between the non-photochromic and the photochromic glasses is readily apparent. The copending application noted earlier teaches various means for converting a photochromic glass to a non-photochromic glass. These include diminishing the copper content in the glass, but not below about 0.2% by weight; increasing the halide concentration in the glass; decreasing the R-value of the glass, but not below 0.15; adding $SnO_2$ in an amount up to about 2% by weight.

TABLE III sets forth some typical photochromic glass compositions in terms of oxides and halogens. These compositions are calculated from the glass batch in parts by weight approximating 100. It will be appreciated that up to 25% of the copper, and up to as much as 60% of the halogen content, may be lost during melting of the batch.

TABLE III

|  | 1 | 2 | 3 | 4 | 5 | 6 |
| --- | --- | --- | --- | --- | --- | --- |
| $SiO_2$ | 58.3 | 55.2 | 58.4 | 57.7 | 59.2 | 60.0 |
| $Al_2O_3$ | 9.0 | 12.0 | 9.0 | 9.0 | 9.5 | 8.1 |
| $B_2O_3$ | 20.0 | 20.0 | 20.0 | 20.0 | 20.1 | 20.3 |
| $Na_2O$ | 10.1 | 10.0 | 10.0 | 10.0 | 4.4 | 10.2 |
| F | 1.4 | 0.7 | 1.2 | 1.5 | — | 0.3 |
| Cl | 0.9 | — | 0.9 | 0.9 | 0.5 | — |
| Br | — | 1.5 | — | — | 0.5 | 0.8 |
| Cu | 0.5 | 0.3 | 0.5 | 0.9 | 0.4 | 0.3 |
| Cd | — | 0.3 | — | — | — | 0.3 |
| $Li_2O$ | — | — | — | — | 1.9 | — |
| $K_2O$ | — | — | — | — | 2.9 | — |

TABLE III-continued

|  | 1 | 2 | 3 | 4 | 5 | 6 |
| --- | --- | --- | --- | --- | --- | --- |
| $SnO_2$ | — | — | — | — | 0.5 | — |

TABLE IV sets forth several typical compositions for non-photochromic glasses. The compositions are presented in terms of oxides and halogen contents as calculated from the batch in parts by weight approximating 100. Again, analyses will show substantially lower copper and halogen contents.

All of the compositions shown in TABLES III and IV represent glasses suitable for producing articles in accordance within the present invention.

TABLE IV

|  | 7 | 8 | 9 | 10 | 11 | 12 |
| --- | --- | --- | --- | --- | --- | --- |
| $SiO_2$ | 56.6 | 52.6 | 77.5 | 56.5 | 55.8 | 72.8 |
| $Al_2O_3$ | 8.5 | 4.4 | 1.9 | 9.4 | 8.4 | 0.3 |
| $B_2O_3$ | 25.3 | 17.7 | 13.6 | 19.0 | 24.9 | 21.2 |
| $Li_2O$ | 4.0 | 1.0 | — | 1.1 | 2.6 | 0.4 |
| $Na_2O$ | 3.6 | 7.8 | 3.9 | 8.5 | 6.3 | 1.2 |
| $K_2O$ | — | 1.3 | — | 1.5 | — | 1.4 |
| $ZrO_2$ | — | 10.6 | — | — | — | — |
| $SnO_2$ | 0.6 | 1.0 | 0.6 | 0.9 | 0.6 | 0.6 |
| CuO | 0.4 | 0.8 | 0.5 | 0.8 | 0.4 | 0.5 |
| Cl | 0.6 | 0.6 | 0.9 | 0.3 | 0.6 | 1.0 |
| Br | 0.4 | 0.4 | 0.5 | 0.3 | 0.4 | 0.7 |
| F | — | 1.8 | 0.8 | 1.8 | — | — |

Glass batches were formulated on the basis of these compositions using standard glass-making materials including sand, alumina, oxides, carbonates and halides. The batches were ballmilled to ensure homogeneity and melted in covered crucibles. While any of the glasses might have been used, we elected to use the glass having the composition of example 5 to fabricate articles demonstrating UV-absorbing, polarizing characteristics of the present invention. A 22 Kg (10 lb.) batch for this glass was formulated, mixed and melted for 6 hours at 1450° C. For test purposes bars having dimensions of 6.25×1.25×70 cms. (2.5"×0.5"×28") were poured from the melt into molds.

Two bars cast from the melt were selected for treatment. Both bars were heat treated for 75 minutes to form the requisite crystal phase. One bar was heat treated at 725° C.; the other bar was heat treated at 750° C. Both bars were redrawn by being placed under a stress of 18,750 Pa (2700 psi) at a temperature approximating the glass softening point. The conditions of treatment set forth are intended only to be exemplary, and not to constitute limits.

Three samples from each bar were then fired in a hydrogen atmosphere for 2.5 hours. One sample was fired at 380° C.; a second was fired at 415° C.; and a third was fired at 450° C. Transmittance measurements were then made on each sample using a Hitachi U4001 spectrophotometer.

The accompanying drawing shows the transmittance curves for both the parallel and perpendicular polarized light for the samples fired at 415° C. Transmittance in percent is plotted along the vertical axis, and wavelength in nanometers is plotted along the horizontal axis. The respective curves for perpendicular and parallel polarized light are designated as A and B. The curves for the samples fired at 450° C. are not shown since they do not appreciably differ from those for the samples fired at 415° C.

We claim:

1. A UV-absorbing, polarizing glass article, the glass having an $R_2O$-$B_2O_3$-$SiO_2$ base glass composition, a sharp spectral cut-off at about 400 nm, a precipitated crystal phase consisting of halide crystallites selected from the group composed of cuprous, cadmium and mixed cuprous-cadmium halide crystallites, the crystallites in the crystal phase being elongated, and a portion of the crystallites near the surface of the article being at least partially reduced to colloidal copper, whereby the article exhibits permanent dichroic behavior.

2. An article in accordance with claim 1 wherein the glass composition includes 0.2–2.0 weight percent copper calculated as $Cu_2O$ and 0.25–2.0% of a halogen selected from bromine, chlorine and mixtures.

3. An article in accordance with claim 1 wherein the glass composition consists essentially of, as calculated from the glass batch in weight percent on an oxide and halogen basis; 40–80% $SiO_2$, 4–35% $B_2O_3$, 0–26% $Al_2O_3$, 0–8% $Li_2O$, 0–15% $Na_2O$, 0–20% $K_2O$ the total $Li_2O + Na_2O + K_2O$ being 2–20%, 0–10% $CaO + BaO + SrO$, 0.2–2% $Cu_2O$, 0–2% CdO, 0–12% $ZrO_2$, 0–2.5% $SnO_2$, 0–2% $As_2O_3 + Sb_2O_3$, 0–2 Cl, 0–2% Br, 0.25–2.0% Cl+Br, 0–2% F, with an R-value in the range of 0.15–0.45.

4. An article in accordance with claim 1 wherein the glass is a non-photochromic glass.

5. A non-photochromic glass article in accordance with claim 4 wherein the glass composition consists essentially of, as calculated from the glass batch in weight percent on an oxide and halogen basis, 48–80% $SiO_2$, 10–35% $B_2O_3$, 0–12% $Al_2O_3$, 0–4% $Li_2O$, 0–14% $Na_2O$, 0–12% $K_2O$, 4–15% $Li_2O + Na_2O + K_2O$, 0–10% $CaO + BaO + SrO$, 0.2–1.6% $Cu_2O$, 0–2% CdO, 0–12% $ZrO_2$, 0–2.5% $SnO_2$, 0–2% $As_2O_3 + Sb_2O_3$, 0–1.75 Cl, 0–1% Br, 0.25–2.0% Cl+Br, 0–2% F, with an R-value in the range 0.15–0.45.

6. An article in accordance with claim 1 wherein the glass is a photochromic glass.

7. A photochromic glass article in accordance with claim 6 wherein the glass composition consists essentially of, as calculated from the glass batch in weight percent on an oxide and halogen basis, 40–75% $SiO_2$, 4–26% $B_2O_3$, 4–26% $Al_2O_3$, 2–8% $Li_2O$, 4–15% $Na_2O$, 6–20% $K_2O$, 0.3–2% $Cu_2O$, 0–2% Cl+Br, 0–2% F.

8. A method of producing a UV-absorbing, polarizing glass article which comprises the steps of melting a batch for a $R_2O$-$B_2O_3$-$SiO_2$ base glass containing at least 0.2% by weight $Cu_2O$ together with a sufficient amount of at least one halogen selected from chlorine and bromine to react with at least 0.2% copper, precipitating cuprous halide crystallites in the glass, subjecting the glass to a stress in one direction to elongate the glass and the cuprous halide crystallites therein, and then exposing the glass to a reducing atmosphere to reduce at least a portion of the copper halide crystallites in a thin layer near the surface of the glass.

9. A method in accordance with claim 8 which further comprises cooling the molten glass while avoiding crystallite formation, and thereafter reheating the glass to thermally precipitate cuprous halide crystallites.

10. A method in accordance with claim 9 wherein the glass is reheated to a temperature in the range of 500°–900° C.

11. A method in accordance with claim 8 wherein the glass is exposed to a reducing atmosphere at a temperature of at least about 400° C.

12. A method in accordance with claim 8 wherein the reducing atmosphere is hydrogen.

* * * * *